Sept. 29, 1936. F. B. HERZ 2,056,123

AUXILIARY FRONT FOR RADIATORS

Filed June 11, 1934

INVENTOR
Ferdinand B. Herz

Patented Sept. 29, 1936

2,056,123

UNITED STATES PATENT OFFICE 2,056,123

AUXILIARY FRONT FOR RADIATORS

Ferdinand B. Herz, Detroit, Mich., assignor, by mesne assignments, to Borg-Warner Corporation, Chicago, Ill., a corporation of Illinois Application June 11, 1934, Serial No. 730,136

1 Claim. (Cl. 293—54)

The invention relates to grilles more particularly designed for use in front of radiators on motor vehicles and the present application forms a continuation in part of my earlier filed application Serial No. 560,515, filed August 31, 1931. The invention consists in the novel construction and more particularly in the means for attaching the ribs which form the grille to a mounting, as hereinafter set forth.

In the drawing:

Fig. 1 is a front elevation of the grille;

Fig. 2 is an enlarged elevation showing a pair of ribs and a transversely extending mounting member to which they are attached;

Fig. 3 is a cross section on line 3—3, Fig. 2;

Fig. 4 is a view similar to Fig. 3 showing a slightly modified construction;

Figs. 5 and 6 are respectively a front elevation and end elevation showing another way in which the ends of the ribs may be attached to the transverse members;

Fig. 7 is a perspective view of a portion of one of the channel ribs showing the ears projecting therefrom before engagement of the same with the transverse member.

My improved grille comprises essentially a series of parallel hollow ribs formed from strips of sheet metal bent to form a channel cross section, and transversely extending members to which said ribs are attached and by which they are held in spaced relation to each other. As shown in Fig. 1, the hollow ribs A are attached to a frame B which has at its upper and lower ends transversely extending members or webs B', B² and intermediate its ends one or more cross bars or transversely extending members C. The hollow channel ribs A are of a substantially V-shaped cross section having a rounded front and a channel opening to the rear. The attachment between these ribs and the transverse members is formed by ears D which extend through slots or apertures in said members and are then turned to form a clinching engagement therewith. One form of engagement between the ribs and transverse members is illustrated in Figs. 2 and 3 in which the ears D project from the edges of the channel sides and are first turned inward toward each other to form shoulders E and then outward in contact with each other and through a slot F in the transverse member such as B'. The ears are then turned oppositely into contact with the under face of the member B' as indicated at G, thereby locking the rib in position. In Fig. 4 a modified construction is shown where the ears D extend through a pair of slots F', F² in the transverse member respectively in registration with the edges of the channel sides. These ears are then bent outward against the under side of the transverse member as shown at H.

Figs. 5 and 6 illustrate another modification in which the ends of the channel ribs A are slit to provide flanges or ears I which extend through an aperture J in a flange K on the transverse member, said flange extending perpendicular to the plane of the ribs. The flanges or ears I are then bent against the flange K and preferably spot welded thereto, thereby firmly securing the rib to the transverse member.

In securing the ribs to the mounting, any one of these several forms of attachment may be employed for securing to one or more of the transverse members, or if desired, one form may be used on one transverse member and another form on another member. In all, the attachment is through projecting ears or flanges on the hollow ribs, passing through apertures in the transverse member and bent into clinching engagement therewith.

What I claim as my invention is:

In a grille or auxiliary front for a radiator, a frame having a transversely extending web portion provided with a vertically extending slot, and a hollow rib having ears bent to form shoulder portions arranged to engage the outer face of the web portion of said frame adjacent the slot therein and having laterally bent extensions of said ears arranged to cooperate with said shoulder portions to clampingly engage the web portion of the frame adjacent the slot therein.

FERDINAND B. HERZ.